May 11, 1965 F. PAPKE 3,182,546
ALBADA VIEWFINDER FOR PHOTOGRAPHIC CAMERAS WITH OPTICAL
MEANS INCLUDING REFLECTOR ON REAR ELEMENT
FOR VIEWING EXTERNAL INDICATOR
Filed June 27, 1960 2 Sheets-Sheet 1
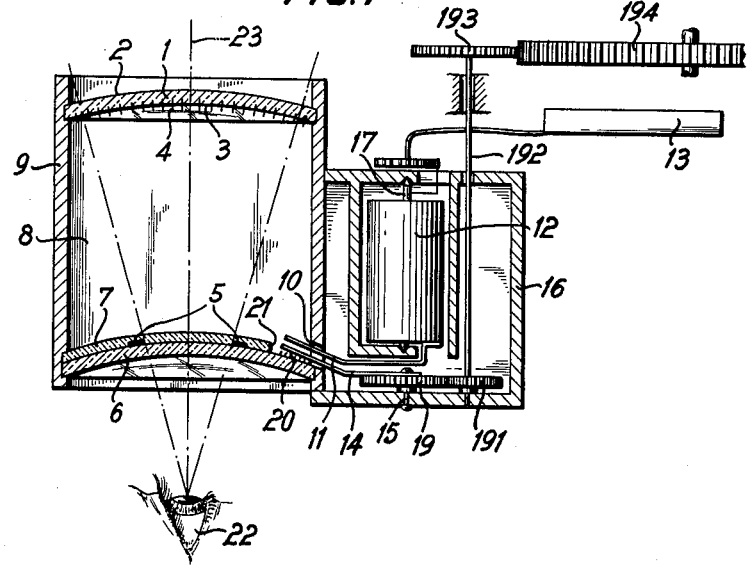
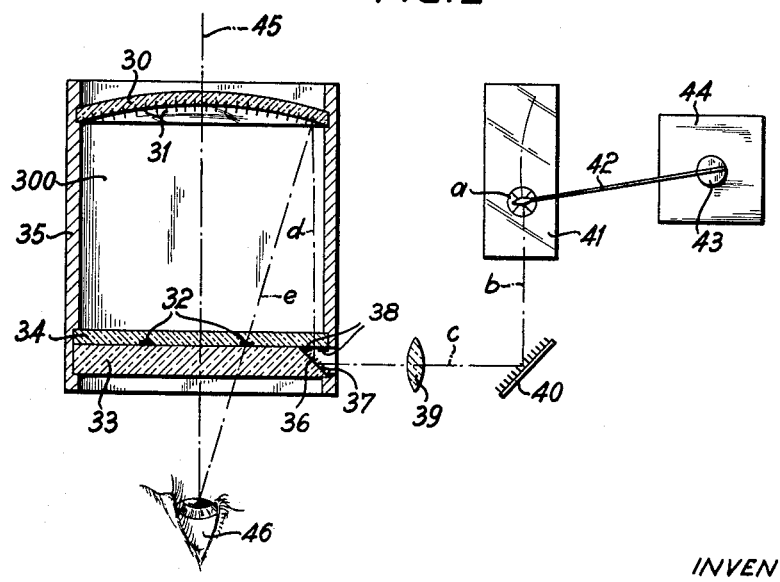
INVENTOR
FRIEDRICH PAPKE
BY
Blum, Moscovitz,
Friedman & Blum
ATTORNEYS May 11, 1965  F. PAPKE  3,182,546
ALBADA VIEWFINDER FOR PHOTOGRAPHIC CAMERAS WITH OPTICAL
MEANS INCLUDING REFLECTOR ON REAR ELEMENT
FOR VIEWING EXTERNAL INDICATOR
Filed June 27, 1960  2 Sheets-Sheet 2

INVENTOR
FRIEDRICH PAPKE

BY
Blum, Moscovitz,
Friedman & Blum
ATTORNEYS

United States Patent Office 3,182,546
Patented May 11, 1965

3,182,546
ALBADA VIEWFINDER FOR PHOTOGRAPHIC CAMERAS WITH OPTICAL MEANS INCLUDING REFLECTOR ON REAR ELEMENT FOR VIEWING EXTERNAL INDICATOR
Friedrich Papke, Braunschweig, Gliesmarode, Germany, assignor to Voigtlander A.G., Braunschweig, Germany, a corporation of Germany
Filed June 27, 1960, Ser. No. 38,880
Claims priority, application Germany, June 27, 1959, V 16,795
3 Claims. (Cl. 88—1.5)

This invention relates to Albada type viewfinders for photographic cameras and, more particularly, to novel means for providing, in the field of view of such viewfinders, an image of the position of one or more exposure condition setting or indicating elements or components.

It is frequently important, in using photographic cameras, to provide an image of the indication of an exposure meter in the field of view of a viewfinder, so that the user of the camera can be apprised of the indication of the exposure meter either prior to or during the exposure and without having to remove the camera from his eye. In addition, it is also desirable to provide, in the field of view of the viewfinder, an indication of the position of other exposure condition setting or indicating elements or components of the camera, either in addition to the indication of the exposure meter or in substitution for the latter.

The problem of providing, within the field of view of a viewfinder, an image of the position of an exposure condition setting or indicating element is relatively simple where the viewfinder is provided with an eye-piece having a positive refraction or refractive power of such a nature that the images of the components, to be provided in the field of view, can be brought within the focal plane of the eye-piece. Such arrangements have become a familiar feature in the case of monocular reflux cameras. The problem of providing such an image or indication is also rather simply solved in the case of viewfinders of the "Newtonian" type wherein the eye-piece or ocular has a positive refraction.

However, in the case of Albada type viewfinders where the magnification ratio of 1:1, the problem is providing indications of exposure condition setting or indicating elements within the field of view of the viewfinder poses certain difficulties, since there is no positive refraction available for the collimation of the image to be focused into the field of view of the viewfinder, and thus no positive refraction for the image of an exposure condition setting or indicating means which is to be focused into the field of view of the indicator. This is because the focal plane of the concave mirror used in an Albada viewfinder lies in proximity to the eye opening of the viewfinder. Furthermore, the illumination of the picture limiting frame, which is also located near such eye opening and is arranged to be focused at substantially infinity by such concave mirror, is appreciably reduced.

The present invention is directed to providing, in Albada type viewfinders mounted in photographic cameras, an indication of the reading or setting of an exposure condition setting or indicating element, and without reducing any of the illumination normally available for reflection of the picture limiting frame.

In accordance with the present invention, means are provided substantially at the focal plane of the concave mirror, and laterally within the range of view through the finder eyepiece, for directing light rays imaging the setting or indicating component or element to the concave mirror so that a collimated imaging of the component or element, is effected by the semi-permeable concave mirror of the Albada finder, and which is normally used only for providing an image of the picture limiting frame. Thereby, the light for imaging the setting or indicating component is derived preferably from the object area containing the scene to be photographed, either through the partially permeable mirror of the finder or along a path or trajectory lying in proximity to the housing of the finder.

The arrangement embodying the present invention has the advantage of being very simple and practical to manufacture. It is particularly adaptable to that type of Albada viewfinder wherein there is a large air space between the front piece or lens and the lens supporting the picture limiting frame.

In accordance with a further feature of the invention, the light directing means is situated within the area embraced by the finder housing, in view of the fact that the image of the setting or indicating component is to be focused at infinity by the concave semi-permeable mirror. Preferably, the light directing means is mounted directly on the lens supporting the picture limiting frame, either on the surface thereof facing the object or on a laterally extending surface, such as a ground bevelled or inclined surface. This latter surface may be completely mirror coated, whereupon the indicators of the setting or indicating components which are relatively dark, and even deep black, are positioned to swing in front of this reflecting surface. Alternatively, an image of the position of the setting or indicating components is focused at this surface from outside the housing by means of appropriately arranged and mounted mirrors and, if needed, a focusing lens. The mirrored bevelled surface, which is immediately adjacent or on the lens supporting the picture limiting frame, reflects the image of the indicating or setting component to the partially permeable concave mirror of the finder by which latter the image is focused at substantially infinity.

Alternatively, and within the purview of the invention, it is also feasible for a self-illuminated indicator to be positioned before a dull black surface or to be positively imaged and focused at substantially infinity.

In accordance with a further feature of the invention, the image of the setting or indicating component which is to be reflected to the semi-permeable concave mirror may be provided by means of a light source disposed outside the finder housing, either through a window in the general vicinity of the partially permeable concave mirror, or by means of an additional mirror or prism arrangement. The finder can also be enclosed within a housing which is equipped with attachments serving as supports for the exposure meter or for enclosing the same.

For an understanding of the principles of the invention, reference is made to the following description of typical embodiments thereof as illustrated in the accompanying drawings. In the drawings:

FIG. 1 is a somewhat diagrammatic axial sectional view through a known type of Albada finder provided with an air space between its front member and its ocular lens, and illustrating an arrangement wherein the indicators of a re-set device and of an exposure meter project within the finder viewer area, the axis of the exposure meter being normally substantially horizontal;

FIG. 2 is a view similar to FIG. 1 illustrating an arrangement wherein a true image of the indicator or setting element is formed outside the finder and directed thereinto, the axis of the exposure meter being normally substantially vertical;

Figure 3:
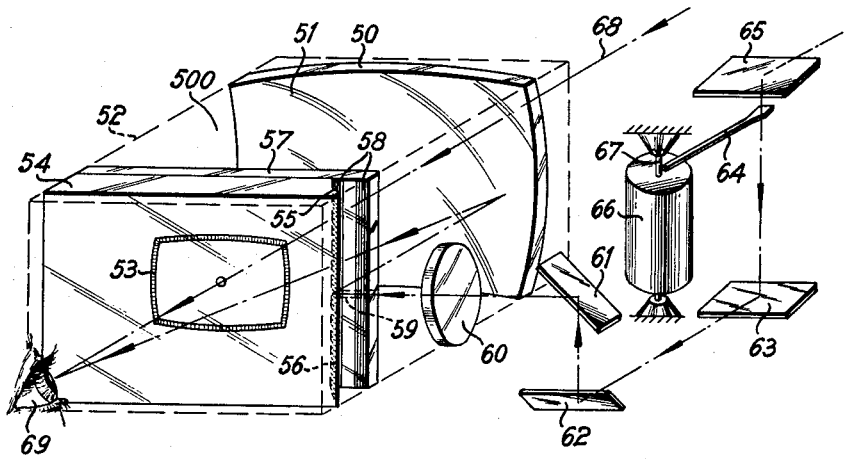
FIG. 3 is a perspective view of the arrangement shown in FIG. 2, but with the exposure meter arranged in a somewhat different position.

Referring to FIG. 1, the Albada type finder illustrated therein includes a front or forward member 1 having curved surfaces 2 and 3 of such curvature that they have no optical effect of any consequence. The inner concave surface 3 of member 1 serves as a supporting surface for a partially permeable mirror 4 arranged to focus, at substantially infinity, the image of the picture limiting frame 5. Frame 5 is positioned on the outer surface of the ocular member or eyepiece 6, and a meniscus lens 7 is cemented to this outer surface and protects the preferably vaporization deposited frame 5 from the entry of dust or any other injury. The refraction of the composite members 6–7 is approximately zero, as is also the case with the forward optical element 1. Forward element 1 and the composite element 6–7 are separated by an air space 8 enclosed by a housing 9 serving to hold the finder components in assembled relation.

Housing 9 has an opening 10 on its right side, as viewed in FIG. 1. The indicator or pointer 11 of a measuring instrument 12, of known type and forming part of a photoelectric exposure meter, projects inwardly through opening 1, instrument 12 being connected in a known manner with a photoelectric cell 13. In addition, a second indicator 14 projects through opening 10 into air space 8. Indicator 14 is secured to a shaft or bearing 15 rotatable in housing 16 of the measuring instrument 12. Bearing shaft 15 is substantially coaxial with the axis of rotation 17 of the measuring instrument 12.

Indicator 14 is movable with exposure condition setting components of the camera by means of known transmission arrangements, these setting components controlling either the shutter time or the diaphragm opening or both of these exposure conditions. A transmission arrangement shown by way of example includes a gear 19 secured on the bearing shaft 15 and meshing with a gear 191 secured on a shaft 192 rotatably mounted in housing 16 and having a gear 193 on its opposite end projecting outside the housing. Gear 193 meshes with a gear 194 constituting the exposure condition setting means. Movement of setting means 194 to adjust the exposure condition in accordance with prevailing light conditions effects a corresponding displacement of indicator 14, so that the latter is, in effect, a re-set or derivative indicator.

The images of indicators 11 and 14 must be focused so that they appear within the picture field of the viewfinder. For this purpose, a reflecting surface 20 is provided on member 6 and has an area or length somewhat greater than the range of movement of the indicators 11 and 14. Reflecting surface 20 is disposed within the viewfinder area embraced by the housing 9. Meniscus 7 is correspondingly foreshortened, as indicated at 21. To the eye 22 of an observer, the reflecting surface 20 appears as a bright light background for the darkly imaged indicators 11 and 14. The optical axis of the viewfinder is indicated at 23. Alternatively, a deep black dull lining may be provided in place of the reflecting overlay 20 and, in such case, the indicators 11 and 14 must be made to reflect light, as by being provided with a granular type reflecting coating.

In the embodiment of the invention shown in FIG. 2, an image of the indicator itself, as well as an intermediate image thereof, is focused at substantially infinity. The Albada finder therein illustrated comprises a front optical member 30 having, on its concave inner surface, a partially permeable mirror 31 which focuses the image of picture limiting frame 32 at substantially infinity. Frame 32 is positioned between the cemented together surfaces of optical elements or lenses 33 and 34 which are separated from member 30 by the air space 300 defined by housing 35 which positions the front and rear members in spaced relation to each other. The element 33, nearest the eye, has its periphery ground down on the right side, as viewed in FIG. 2, to an angle of just less than 45 degrees, and this ground surface is polished and provided with a reflecting lining or mirroring 37. Element 34 not only serves as a covering and protecting for frame 32 but also includes a diaphragm 38 opposite the inclined mirror or reflecting surface 36, diaphragm 38 being disposed approximately in the focal plane of the concave mirror 31.

A lens 39 is positioned with its axis substantially in this focal plane and within the path a–b–c of the light ray from the indicator 42 to the mirror 36. Lens 39, in cooperation with mirrors 40 and 41, provides an image of the indicator 42, the axis 43 of which is parallel to the focal plane of mirror 31 and which may also be the axis of rotation of a moving coil instrument 44 forming part of an exposure meter. As oriented relative to the camera, axis 43 extends perpendicularly to the optical axis of the objective of the camera and thus is perpendicular to the optical axis 45 of the viewfinder.

The light ray path from the indicator 42 to the eye 46 of the observer may be divided into several sections in the arrangement shown in FIG. 2. Section a extends perpendicularly from indicator 42 to mirror 41, which is arranged at an angle of about 45 degrees to the indicator. Section b extends to mirror 41 to mirror 40, and is substantially parallel to optical axis 45. Section c extends from mirror 40 through lens 39 to mirror or reflector 37, this section being substantially perpendicular to optical axis 45 and parallel to the plane of the drawing. Section d extends substantially parallel to the optical axis and along the plane of the drawing from mirror 37 to the concave mirror 31. Section e extends from the concave mirror 31 through optical elements 34 and 33 to the eye 46 of the observer.

FIG. 3 schematically illustrates an arrangement similar to that shown in FIG. 2, but in which the indicator or setting unit has its axis of oscillation substantially 90 degrees to the optical axis of the Albada finder and thus extending vertically in respect to the plane of the drawing. The outer or front lens 50 of the finder carries, on its inner surface, the partially light-permeable concave mirror 51, with the housing 52 being indicated merely by broken lines.

Picture limiting frame 53 is disposed on a transparent support plate 54 whose right edge 55, as viewed in FIG. 3, is formed, as by grinding, to extend at an angle of about 45 degrees to the axis of the finder and is polished and coated with a reflecting or mirror surface 56 preferably deposited thereon by vaporization. A transparent protecting plate 57 is cemented to the frame carrying surface of plate 54 so that the frame 53 is completely enclosed and thus separated, by protecting plate 57, from the air space 500. Protecting plate 57 also supports a diaphragm 58 for the intermediate image 59 of the indicator of the exposure meter.

An objective lens 60 is provided adjacent the finder, and has a focal length approximating that of the partially permeable concave mirror 51 on the front lens 50. Reflectors or mirrors 61, 62 and 63 direct light rays from indicator 64 through lens 60 to the reflecting surface 56. An illuminating mirror 65 is mounted outside the exposure meter indicator, with its own focusing arrangement as it is essential to provide indicator 64 of measuring instrument 66 with adequate illumination from the exterior. Indicator 64 forms part of a moving coil instrument 66 whose axis 67 extends perpendicularly to the optical axis 68 of the finder. The eye of an observer is indicated at 69.

Figure 4:
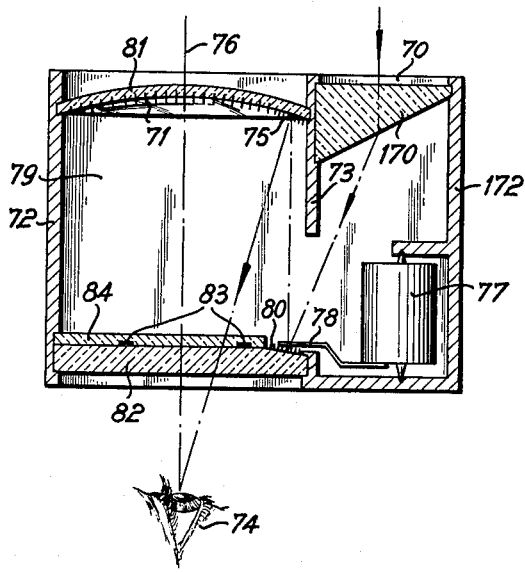
FIG. 4 is a view similar to FIG. 1 and illustrating a modification of the arrangement shown in FIG. 1.

FIG. 4 schematically and somewhat diagrammatically illustrates a finder corresponding substantially to that shown in FIG. 1 but including special provisions for illuminating the exposure meter indicator.

Housing 72 is designed to enclose all the components, including an exposure meter 77. For this purpose, the housing is widened laterally as shown at 172. An illuminating window 70 is formed in extension 172 adjacent the semi-permeable concave mirror 71, and a prism 170 is arranged adjacent window 70 so that the illumination for the indicator comes from the direction of the object to be photographed.

In order that the light rays normally incident into the finder may not be interfered with by rays entering through the window 70, a diaphragm 73 is formed by the wall of the housing 72, and separates the lateral extension 172 from the interior area or air space 79 of the finder, thus preventing rays, entering through the window 70, from directly striking the eye 74 of an observer.

In the arrangement of FIG. 4, as in the arrangement of FIG. 1, it is immaterial whether indicator 78 is luminescent or reflecting and movable relative to a back ground which appears dark, or whether, on the other hand, a relatively dark indicator is movable against a relatively bright reflecting background.

The optical axis of the finder is indicated at 76, with the forward or object facing lens being indicated at 81 and the transparent support plate for the picture limiting frame at 82. A transparent covering plate 84 encloses the picture limiting frame 83, thus effectively separating the frame from the interior space 79, plate 84 being cemented to plate 82 and forming therewith an integral unit. For further improving the focusing of indicator 78, that portion of the concave mirror 71 used primarily for focusing the image of indicator 78 may be fully coated with a reflecting surface as indicated at 75.

While specific embodiments of the invention have been shown and described in detail to illustrate the application of the principles of the invention, it will be understood that the invention may be embodied otherwise without departing from such principles.

What is claimed is:

1. An Albada viewfinder combination for photographic cameras, comprising, a front light entry member having an inner surface and carrying on said inner surface a concave partially light-permeable mirror, a rear eye-confronting optical member having central and lateral forwardly directed surface portions, said lateral surface portion being situated in its entirety to one side of an optical axis along which said front and rear members are located and said central surface portion supporting a picture limiting frame which faces said front member, a housing laterally confining and axially separating said front and rear members and defining between the latter an elongated air space axially separating said front and rear members by a distance locating said picture limiting frame substantially in the focal plane of said concave mirror for imaging by the latter substantially at infinity, said housing having a front open end across which said front member extends and closed by said front member, and said housing having a rear open end across which said rear member extends and said rear open end of said housing being closed by said rear member, so that said central and lateral forwardly directed surface portions of said rear optical member are situated within said housing, said housing having a lateral wall formed with an aperture situated substantially at the focal plane of said concave mirror and located beside and extending forwardly from said lateral surface portion of said rear optical member, an indicator, and reflecting means carried at least in part by said lateral surface portion of said rear optical member for reflecting an image of said indicator to said concave mirror for reflection thereby to provide an image of said indicator substantially at infinity in the field of view of the viewfinder, whereby both the image of said picture limiting frame and the image of said indicator are sharply focused at infinity, said indicator being situated outside of said housing and said reflecting means including reflectors and an objective also situated outside of said housing and directing through said aperture and to the part of said reflecting means which is carried by said lateral surface portion of said rear optical element an image of said indicator to be reflected by the part of said reflecting means at said lateral surface portion of said rear optical element toward said concave mirror.

2. The combination of claim 1 and wherein said indicator is a pointer of a moving coil instrument and has a turning axis perpendicular to said optical axis.

3. The combination of claim 1 and wherein said lateral surface portion of said rear optical element is situated in a plane which makes an angle of 45° with said optical axis.

References Cited by the Examiner
UNITED STATES PATENTS

| | | | |
|---|---|---|---|
| 2,187,057 | 1/40 | Sauer | 88—1.5 |
| 2,197,939 | 4/40 | Leitz | 95—10 |
| 2,924,143 | 2/60 | Kaprelian et al. | 88—1.5 X |
| 2,975,685 | 3/61 | Fegert | 95—10 |
| 2,994,257 | 8/61 | Papke | 88—1.5 X |
| 3,031,940 | 5/62 | Wilson. | |

FOREIGN PATENTS

| | | |
|---|---|---|
| 202,442 | 3/59 | Austria. |
| 878,205 | 9/42 | France. |
| 648,955 | 8/37 | Germany. |
| 842,154 | 6/52 | Germany. |
| 547,045 | 8/42 | Great Britain. |

DAVID H. RUBIN, *Primary Examiner.*

EMIL G. ANDERSON, *Examiner.*